March 29, 1932.  J. R. BARNHART  1,851,658

TUBE CHECKER

Filed May 10, 1928

Inventor
J. R. Barnhart
By Hull Brock & West
Attorney

Patented Mar. 29, 1932

1,851,658

UNITED STATES PATENT OFFICE

JOB R. BARNHART, OF LAKEWOOD, OHIO, ASSIGNOR OF ONE-HALF TO WALTER M. SCOTT, OF LAKEWOOD, OHIO, AND ONE-HALF TO RALEIGH E. TRESISE, OF CLEVELAND HEIGHTS, OHIO

TUBE CHECKER

Application filed May 10, 1928. Serial No. 276,575.

This invention relates to a testing device which is especially adapted for indicating the condition of a vacuum tube such as is used in radio receiving sets.

The main object of the invention is to provide a portable self contained instrument for testing vacuum tubes and which is provided with an indicator for giving a visual indication of interelement short circuits.

Another object of the invention is to provide a testing device of the character set forth which is provided with means for detecting internal short circuits between any of the tube elements and which is also provided with means for giving a visual indication of the filament emission if the tube is not defective.

A further object of the invention is to provide a testing instrument of the character set forth which is simple in construction, dependable and accurate in operation and well adapted for quantity production at comparatively low cost.

Figure 1:
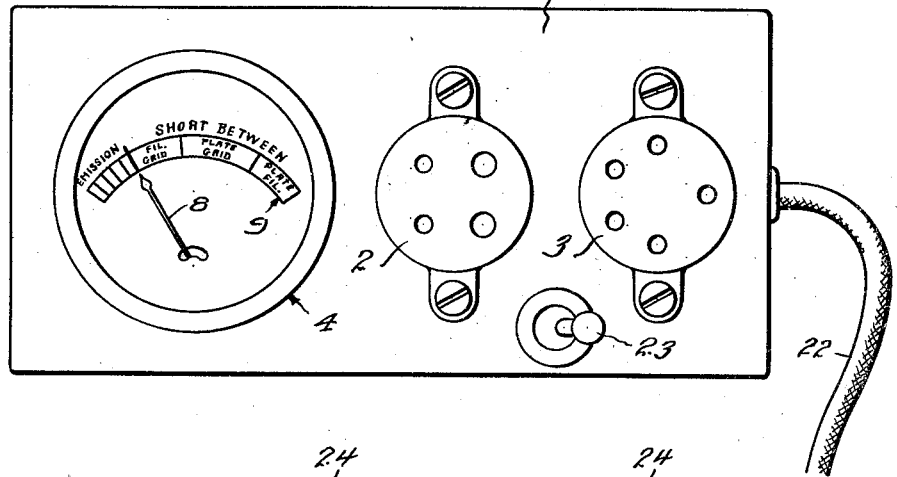
Figure 2:
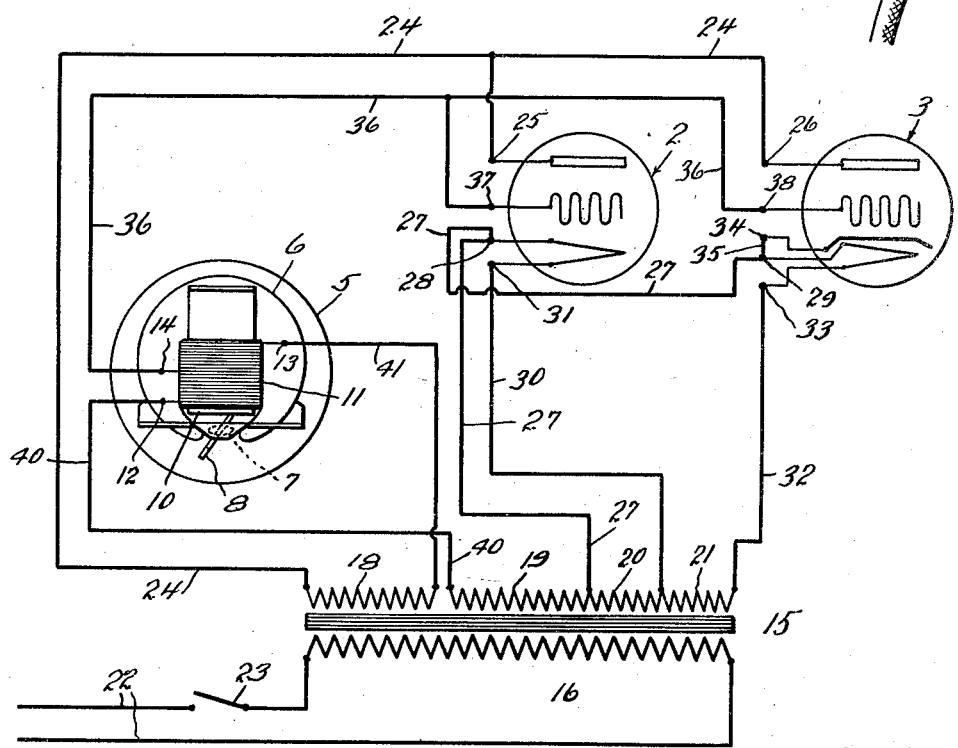

Further and more limited objects of the invention will appear as the description proceeds and by reference to the accompanying drawings in which Fig. 1 is a top plan view of a tube checker or tester embodying my invention and Fig. 2 is a diagrammatic view of the electrical connections and disclosing the essential elements of the meter.

Referring now to the accompanying drawings the reference character 1 designates a casing on the cover of which is mounted a pair of sockets 2 and 3 one of which is adapted to receive a four prong vacuum tube and the other of which is adapted to receive a five prong vacuum tube. Also mounted on the cover is a meter 4 of the type disclosed in my prior Patent No. 1,630,884 issued May 31, 1927.

The meter 4 consists essentially of a base member 5 on which is mounted a permanent horseshoe magnet 6. A needle staff is arranged between the poles of the magnet 6 and secured to the base member in any suitable manner. The staff has mounted thereon an armature 7 and an indicating needle or pointer 8 which travels over a scale 9 having suitable indicia as shown in Fig. 1. Arranged within the permanent magnet 6, as shown in Fig. 2, is a solenoid 10 which is wound on a suitable form and secured adjacent one side thereof is a soft iron core 11. In operation, the permanent magnet exerts a force on the armature 7 which will tend to maintain the pointer at the position shown in Fig. 1. The meter is provided with three posts indicated at 12, 13 and 14 in Fig. 2. The opposite ends of the coil of the solenoid are connected with the posts or terminals 12 and 13, respectively, and the post or terminal 14 is connected with the center of the coil. When an alternating potential is applied to the terminals 12 and 13 the solenoid will be energized and a magnetic field created thereabout. The magnetic lines of force of this field pass through the soft iron core 11 and hence cause a higher concentration of the lines of force on this side of the solenoid which will exert a stronger pull on the corresponding side of the armature 7 and hence cause the armature and pointer to be rotated in a predetermined direction, or clockwise as viewed in Fig. 1, each time the solenoid is energized, irrespective of the reversible polarization of the solenoid. Also mounted on the cover of the casing is a transformer 15 having a primary winding 16 and a secondary winding 17 made up of a plurality of sections 18, 19, 20 and 21. The meter is connected in series between the sections 18 and 19. The primary winding 16 is provided with an extension 22 for connecting the same with a source of alternating current and includes therein a switch 23.

Leading from one end of section 18 of the secondary winding is a wire 24 which connects with the plate contacts 25 and 26 of the sockets 2 and 3. Leading from one end of section 20 of the secondary winding is a wire 27 which connects with the filament contacts 28 and 29 of sockets 2 and 3. Leading from the opposite end of section 20 of the secondary winding is a wire 30 which is connected with the opposite filament contact 31 of socket 2. Leading from the opposite end of the secondary winding section 21 is a wire 32 which is connected with the filament contact 33 of the socket 3. The cathode contact 34 of the socket 3 is connected with the contact 29 by a wire 35. Leading from the terminal 14 of the meter is a wire 36 which is connected with the grid contacts 37 and 38 of the sockets 2 and 3. The terminal 12 of the meter is connected with section 19 of the secondary winding of the transformer by a wire 40. The terminal 13 of the meter is connected with section 18 of the secondary winding of the transformer by a wire 41.

The several sections of the secondary winding each have a different number of turns of wire so as to deliver a current of different voltage through the solenoid depending upon which of the tube elements are shorted and thus varying the pull on the armature to correspond with the scale divisions over which the pointer travels. The complete secondary winding is designed to give a potential of 42.5 volts, the section 18 delivering 24 volts, the section 19 delivering 16 volts, the section 20 delivering 1.5 volts and the section 21 delivering 1 volt. The tube filament of a tube in socket 2 will be heated by a current of 1.5 volts and the tube filament in a tube in socket 3 will be heated by a current of 2.5 volts.

When it is desired to check a tube of the four prong type (for example type 226) for the purpose of determining whether there are any interelement short circuits, the tube is inserted in the socket 2 and the extension plug connected with a source of alternating current and the switch turned on. An alternating current of 1.5 volts heats the filament and flows from the secondary winding section 20 through wire 30, filament contact 31, tube filament, filament contact 28, wire 27 back to the secondary winding section 20. Should there be a short circuit between the filament and grid of the tube, the current will flow from the tube filament through the tube grid, grid contact 37, wire 36, terminal 14, half of meter coil, terminal 12, wire 40 and back to secondary winding section 19. It will thus be seen that a current of 16 volts flows through one-half of the meter coil and exerts a pull on the armature and moves the pointer over the scale to the division of the scale marked Fil. grid.

Should there be a short circuit between the tube filament and plate, the current will flow from the filament through the tube plate, plate contact 25, wire 24, secondary winding section 18, wire 41, terminal 13, meter coil terminal 12, wire 40, secondary winding section 19, wire 27, contact 28 to filament. It will be seen that in this circuit a current of 40 volts will flow through the entire meter coil thereby actuating the armature and moving the pointer the maximum distance toward the right as seen in Fig. 1 over the last scale division marked Plate-fil.

Should there be a short between the plate and grid current flows from the secondary section 18 through wire 41, terminal 13, half of meter coil, terminal 14, wire 36, grid contact 37, tube grid, tube plate, plate contact 25, wire 24, to the opposite end of secondary winding section 18. It will be seen that a current of 24 volts flows through half of the meter coil and actuates the armature and moves the pointer 8 over the scale division marked Plate grid.

If there be no short circuits between the elements of the tube a uni-directional pulsating current will flow through the meter coil thus creating a pull on the armature 7 in the opposite direction and moving the pointer toward the left as seen in Fig. 1 over the scale division marked Emission. The electrons will flow from the filament through the grid and strike the plate, the return circuit being through contact 25, wire 24, secondary winding section 18, wire 41, meter terminal 13, coil 10, meter terminal 12, wire 40, secondary winding section 19, wire 27, contact 28 back to the tube filament. It will therefore be seen that due to the valve action of the tube a uni-directional pulsating current flows through the meter coil and exerts a pull on the armature 7 to move the pointer toward the left as seen in Fig. 1. This division of the scale is calibrated in arbitrary units indicating filament emission. By comparison of emission tests on different tubes a standard of comparison is obtained. When the pointer swings toward the left and stays on the emission scale, the tube is not shorted. Frequently however some tubes will show a short as soon as the tube is inserted and the current turned on but oftentimes tubes which are actually defective will show Emission before the filament reaches its maximum temperature and short when the filament is fully heated. In such cases the pointer will first register Emission and then after an interval of ten or fifteen seconds suddenly moves to the Fil-grid position, thus showing that the short is developed only after the filament is heated and sags to touch the grid. It is therefore necessary to allow the filament to heat up to a temperature normally obtained under working conditions to obtain an accurate check.

In case it is desired to test a five element tube, the tube is inserted in the socket 3 which is a five hole socket. The operation of the device is identical with that described in connection with the four element tube. The only difference is that the cathode contact 34 is connected with the filament contact 29, as hereinbefore described.

This device is particularly designed for checking tubes known in the trade as 226 AC tubes and 227 AC tubes; but it can also be used with tubes known in the trade as 199 and 120 tubes, in which case a five prong four-hole adapter is first inserted in the socket 3. However, all kinds of tubes except the external heater type tubes can be tested for interelement shorts, including rectifier tubes.

Various changes may be made in the details of construction and arrangement of the several parts and connections without departing from the spirit of my invention and I wish my invention to be limited only in accordance with the scope of the appended claims.

The term "three-element" appearing in the appended claims is not used in a limited sense, but is intended to apply to vacuum tubes having three or more elements.

Having thus described my invention, what I claim is:—

1. A device for indicating interelement short circuits in three-element vacuum tubes comprising a tube socket adapted to receive a tube to be tested, a transformer, a meter, the said meter, transformer and socket being electrically connected with a source of current in such a manner as to impress different voltages on said meter to move the indicating element thereof different distances upon short-circuits between different pairs of said elements.

2. A device for indicating interelement short circuits in three-element vacuum tubes comprising a transformer adapted for connection with a source of alternating current, a tube socket adapted to receive a vacuum tube to be tested, a voltmeter, the secondary winding of the transformer having a plurality of connections leading therefrom and connected with the meter terminals and socket contacts in such a manner as to impress different voltages upon said meter to produce distinctive indications identifying which of the tube elements are short circuited.

3. A device for indicating interelement short circuits in three-element vacuum tubes comprising a portable casing, one or more vacuum tube sockets carried by said casing, a transformer carried by said casing and adapted for connection with a source of alternating current, an alternating current voltmeter carried by said casing, connections leading from the secondary winding of the transformer at spaced points thereon and connected with said meter terminals and socket or sockets in such a manner as to impress different voltages upon said voltmeter upon short-circuit between different pairs of elements of the tube being tested.

4. A device for testing vacuum tubes for interelement short circuits comprising a transformer and means for connecting the same with a source of alternating current, an alternating current voltmeter connected in series with the secondary winding of the transformer, a vacuum tube socket adapted to receive a vacuum tube therein, means connecting the plate and filament contacts of the socket with the secondary winding of the transformer at spaced points in series with said meter and means connecting the grid contact of the socket to the secondary winding through the meter terminals in such a manner as to give a distinctive visual indication identifying which of the tube elements are short circuited.

5. A system for indicating short-circuits between elements of a vacuum tube comprising an electric meter, a source of current, and circuits connecting said meter, said elements and said source, said meter being effectively connected in circuit between each pair of said elements, and each circuit including different values of voltage whereby a short-circuit between any two of said elements will produce a distinctive indication on said meter.

6. A system for indicating short-circuits between elements of a vacuum tube comprising an electric meter, circuits connecting said meter between each pair of said elements, and sources of current having different voltages included in said circuits respectively, whereby short-circuits between any two elements will be indicated by a distinctive indication on said meter.

7. A system for testing three-element vacuum tubes comprising a vacuum tube socket, and a source of alternating current connected to the terminals of said socket for energizing the plate circuit of the tube to be tested, and an electric meter connected in the plate circuit, said meter comprising means for indicating space current flowing in said circuit, and means responsive to alternating current for indicating a short-circuit between the elements of said tube.

8. A system for testing vacuum tubes comprising a vacuum tube socket and a source of alternating current connected to said socket for energizing the plate circuit of the tube to be tested, and indicating meter connected in said circuit comprising a movable pointer and means responsive to direct current for moving said pointer in one direction to indicate space current flowing in said circuit, and means responsive to alternating current for moving said pointer in the opposite direction for indicating a short-circuit between the elements of said tube.

In testimony whereof, I hereunto affix my signature.

JOB R. BARNHART.